United States Patent
Kuroyanagi et al.

(10) Patent No.: US 7,202,660 B2
(45) Date of Patent: Apr. 10, 2007

(54) ROTATIONAL POSITION SENSOR INCLUDING A HELICAL GEAR ROTOR AND A MAGNETIC RESISTANCE ELEMENT

(75) Inventors: Susumu Kuroyanagi, Anjo (JP); Yukihiro Kato, Kariya (JP)

(73) Assignee: Denso Corporation, Kariya (JP)

( * ) Notice: Subject to any disclaimer, the term of this patent is extended or adjusted under 35 U.S.C. 154(b) by 29 days.

(21) Appl. No.: 11/224,315

(22) Filed: Sep. 13, 2005

(65) Prior Publication Data
US 2006/0055398 A1  Mar. 16, 2006

(30) Foreign Application Priority Data
Sep. 14, 2004 (JP) ............... 2004-266955

(51) Int. Cl.
*G01B 7/30* (2006.01)
(52) U.S. Cl. ............... 324/207.25; 324/207.21; 324/207.22

(58) Field of Classification Search ............... 324/207.12–207.25, 166–174
See application file for complete search history.

(56) References Cited

U.S. PATENT DOCUMENTS

| 5,491,633 A * | 2/1996 | Henry et al. ............... 701/36 |
| 6,545,463 B1 * | 4/2003 | Dettmann et al. ...... 324/207.21 |
| 2002/0011840 A1 * | 1/2002 | Li .................... 324/207.21 |

* cited by examiner

*Primary Examiner*—Jay M. Patidar
(74) *Attorney, Agent, or Firm*—Posz Law Group, PLC (57) ABSTRACT

A rotation sensor has a sensor and a processing circuit that are provided as an integrated circuit chip (IC chip). The sensor has a magnetic resistance element. The rotation sensor senses an angular change of a magnetic vector as a change of resistance. The rotation sensor is located to face a rotor, or a helical gear used in an automatic transmission. The magnetic resistance element is located such that a sensing plane thereof is parallel to a hypothetical plane perpendicular to the line of inclination of each tooth of the rotor.

15 Claims, 8 Drawing Sheets

COMPARATIVE EXAMPLE

COMPARATIVE EXAMPLE

ROTATIONAL POSITION SENSOR INCLUDING A HELICAL GEAR ROTOR AND A MAGNETIC RESISTANCE ELEMENT

CROSS REFERENCE TO RELATED APPLICATION

This application is based on and incorporates herein by reference Japanese Patent Application No. 2004-266955 filed on Sep. 14, 2004.

BACKGROUND OF THE INVENTION

1. Field of the Invention

The present invention relates to a rotation sensor for sensing rotation of an input shaft or an output shaft of an automatic transmission of a vehicle or the like. Specifically, the present invention relates to a rotation sensor for sensing the rotation by sensing an angular change of a magnetic vector.

2. Description of Related Art

Figure 10:
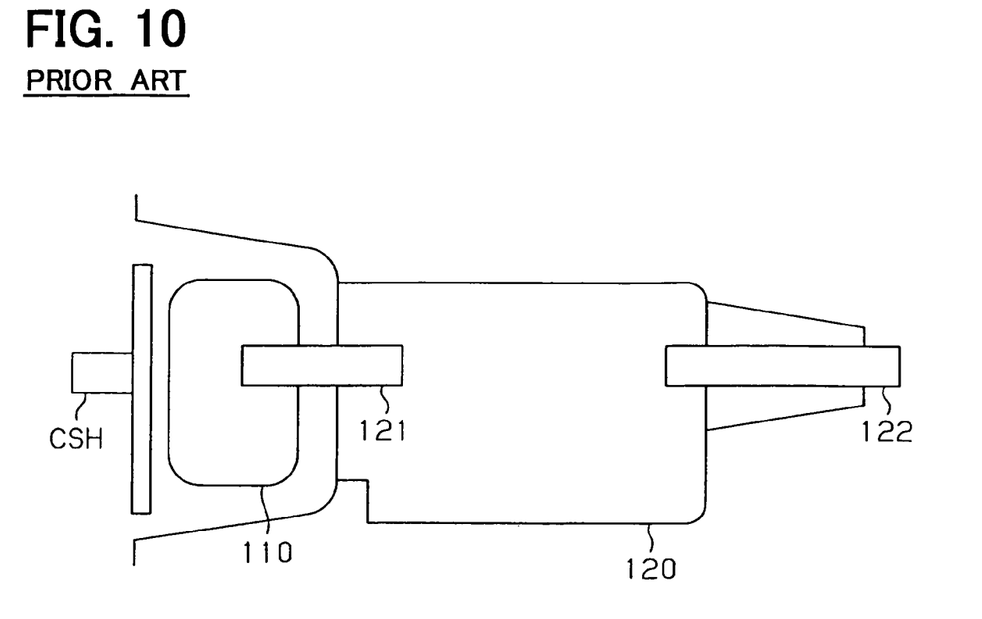
FIG. 10 is a block diagram showing structure of a prior art automatic transmission.

An automatic transmission, for example, as shown in FIG. 10, automates clutch operation or gear-changing and is mounted on a vehicle. As shown in FIG. 10, the automatic transmission has a torque converter 110 and an automatic transmission mechanism 120. The torque converter 110 is driven by an engine and converts torque of the engine. The automatic transmission mechanism 120 automatically adjusts a rotation ratio, i.e., a gear ratio, between an input shaft 121, which is rotated by the torque transmitted through the torque converter 110, and an output shaft 122 mounted on an opposite side from the input shaft 121.

The torque converter 110 receives the torque (rotational force) of a crankshaft CSH, i.e., output shaft, of the engine and stably transmits the rotational force to the automatic transmission mechanism 120. The torque converter 110 also has a function of increasing the rotational force of the crankshaft CSH when the motive power of the engine increases and the rotation speed of the crankshaft CSH increases.

The automatic transmission mechanism 120 has a gear portion, a clutch, an oil pressure circuit, and an electronic controller. The gear portion includes a planetary gear mechanism that variably controls the gear ratio between the input shaft 121 and the output shaft 122. The clutch turns on or off the variable control performed by the gear portion for varying the gear ratio. The oil pressure circuit and the electronic controller control the on-off operation of the clutch.

Thus, the motive power of the engine is transmitted to the input shaft 121 of the automatic transmission mechanism 120 through the torque converter 110, and the input shaft 121 starts rotating at a predetermined rotation speed. The electronic controller of the automatic transmission mechanism 120 automatically controls the on-off operation of the clutch and the variable control of the gear ratio performed by the gear portion, based on conditions such as vehicle speed and engine rotation speed, which are input every time the automatic control is performed. Thus, the output shaft 122 rotates at a suitable gear ratio with respect to the input shaft 121.

A rotation sensor is typically mounted to the input shaft 121 or the output shaft 122 of the automatic transmission to monitor rotation speed of the input shaft 121 or the output shaft 122. Thus, the suitability of the gear change control can be examined.

If the rotation sensor is mounted in the automatic transmission, i.e., if the rotation sensor is mounted to the input shaft 121 or the output shaft 122 of the automatic transmission mechanism 120, usually, a spur gear rotor made of a magnetic material is mounted to the input shaft 121 or the output shaft 122. A rotation sensor that has a sensor and a bias magnet is located near the rotor. The sensor has a magnetic resistance element. The bias magnet applies a bias magnetic field to the magnetic resistance element. The rotation sensor senses rotation characteristics of the rotor such as speed by sensing a change in a magnetic vector, which is generated by the rotation of the rotor and by the bias magnetic field, as a change of a resistance of the magnetic resistance element. However, if the rotation sensor is mounted in such a way, space inside the automatic transmission is occupied by the rotor. In an extreme case, there is a possibility that a design of the automatic transmission itself has to be changed to accommodate the rotor.

SUMMARY OF THE INVENTION

It is therefore an object of the present invention to provide a rotation sensor capable of highly accurately sensing rotation of an input shaft or an output shaft of an automatic transmission while reducing consumption of space and while improving versatility.

According to an aspect of the present invention, a rotation sensor has a sensor, which has a magnetic resistance element, and a bias magnet, which applies a bias magnetic field to the magnetic resistance element. The rotation sensor senses an angular change of a magnetic vector caused by rotation of a helical gear rotor, which is made of a magnetic material or which has teeth made of a magnetic material, near the sensor and by the bias magnetic field as a change of a resistance of the magnetic resistance element. Thus, the rotation sensor senses rotation characteristics of the rotor. The magnetic resistance element is located such that a sensing plane of the magnetic resistance element is parallel to a hypothetical plane, along which the angular change of the magnetic vector is caused by the rotation of the rotor and the bias magnetic field.

The magnetic resistance element senses the angular change of the magnetic vector as a change of the resistance. The change of the resistance is maximized when the sensing plane of the magnetic resistance element is parallel to the hypothetical plane, along which the angular change of the magnetic vector is caused. In the rotation sensor of the invention, the magnetic resistance element is located in accordance with the structure of the helical gear rotor. Namely, the magnetic resistance element is located such that the sensing plane thereof is parallel to a hypothetical plane, on which the angular change of the magnetic vector is caused by the rotation of the helical gear rotor near the sensor and by the bias magnetic field. Therefore, the angular change of the magnetic vector-accompanying the rotation of the helical gear rotor appears as a large change of the resistance of the magnetic resistance element. Accordingly, the rotation characteristics of the helical gear rotor can be sensed accurately by sensing the change of the resistance. The rotation sensor of the present invention can be applied to any helical gear of various types of machine, rotation of which is to be sensed. Therefore, versatility of the rotation sensor can be improved.

BRIEF DESCRIPTION OF THE DRAWINGS

Features and advantages of embodiments of the invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1A:
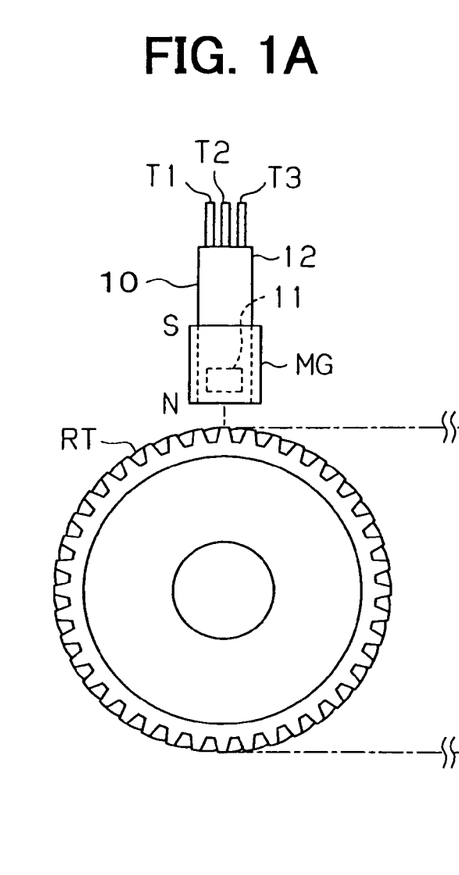
FIG. 1A is a schematic diagram showing a rotation sensor and a rotor according to an embodiment of the present invention.
Figure 1B:
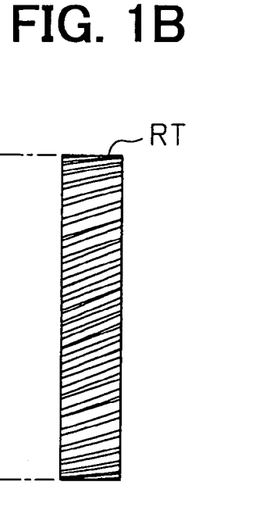
FIG. 1B is a schematic diagram showing the rotor according to the embodiment of FIG. 1A.

Referring to FIG. 1A, a rotation sensor 10 according to one embodiment of the present invention is illustrated. The rotation sensor 10 senses rotation characteristics (such as speed) of an input shaft 121 or an output shaft 122 of an automatic transmission (the outside shape of which is the same as that shown in FIG. 10). The rotation sensor 10 of the present embodiment uses a helical gear shown in FIG. 1A or 1B, which is made of a magnetic material and is used in a gear portion of the automatic transmission, as a rotor (rotating body) RT to be sensed. In other words, the helical gear performs as a gear and transmits power and is not merely a rotor. The rotation sensor 10 senses the rotation characteristics of the input shaft 121 or the output shaft 122 of the automatic transmission by sensing rotation characteristics of the rotor such as speed.

As shown in FIG. 1A, the rotation sensor 10 has a sensor and a processing circuit formed as an integrated circuit chip (IC chip) 11. The sensor senses an angular change of a magnetic vector. The rotation sensor 10 is mounted to face the edge of a rotor RT, which also serves as a helical gear in the automatic transmission. Terminals such as a power source terminal T1, an output terminal T2, and a ground terminal T3 extend from the IC chip 11 as shown. The IC chip 11 is seamlessly molded within the rotation sensor 10 by a molding material 12 such as a resin. The output terminal T2 is connected with an electronic controller to provide the rotation characteristics of the rotor RT and thus the rotation characteristics of the input shaft 121 or the output shaft 122 of the automatic transmission to the controller.

The sensor embedded in the IC chip 11 is a magnetic resistance element (MRE), a resistance of which changes if the sensor senses an angular change of the magnetic vector. A cylindrical bias magnet MG is provided around the IC chip 11 to apply a bias magnetic field to the magnetic resistance element.

Every time a peak of the rotor RT passes near the sensor of the IC chip 11 in accordance with the rotation of the rotor RT, the magnetic vector applied by the bias magnet MG is pulled by the peak, and an angular change of the magnetic vector occurs. The sensor, or the magnetic resistance element, senses the angular change of the magnetic vector as a change of resistance. An electric signal corresponding to the change of resistance is amplified by the processing circuit portion and is output through the output terminal T2, for example.

Next, the electric structure of the sensor and the processing circuit and operation thereof will be explained based on FIG. 2.

Figure 2:
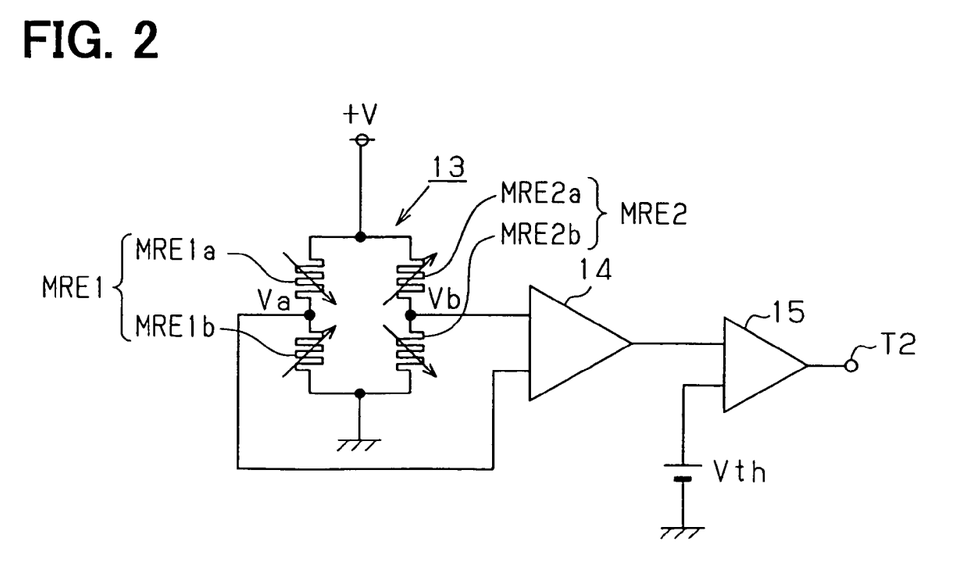
FIG. 2 is a circuit diagram showing an equivalent circuit inside a chip of the rotation sensor according to the embodiment of FIG. 1A.

As shown in FIG. 2, the sensor has first and second magnetic resistance element pairs MRE1, MRE2 that form the magnetic resistance element. The first and second magnetic resistance element pairs MRE1, MRE2 form electrical half bridge circuits respectively. Thus, the sensor is a bridge circuit 13 formed by the first and second magnetic resistance element pairs MRE1, MRE2. The first magnetic resistance element pair MRE1 includes magnetic resistance elements MRE1$a$, MRE1$b$. The second magnetic resistance element pair MRE2 includes magnetic resistance elements MRE2$a$, MRE2$b$. A constant voltage circuit (not shown) applies a constant voltage +V to a point between the magnetic resistance element MRE1$a$ and the magnetic resistance element MRE2$a$. A point between the magnetic resistance element MRE1$b$ and the magnetic resistance element MRE2$b$ is grounded.

If the angular change of the magnetic vector provided by the bias magnet MG occurs in accordance with the rotation of the rotor RT and the resistances of the magnetic resistance elements MRE1$a$, MRE1$b$, MRE2$a$, MRE2$b$ change, the changes of the resistances are derived as changes of middle point voltages Va, Vb of the respective half bridge circuits of the bridge circuit 13. The changes of the middle point voltages Va, Vb are sequentially input into a differential amplifier 14 and a comparator 15, which form the processing circuit. The differential amplifier 14 performs differential amplification of the middle point voltages Va, Vb. The comparator 15 converts the signal that has been subjected to differential amplification into a binary output based on comparison with a predetermined threshold voltage Vth. The binary output (pulse signal) is output through the output terminal T2 as a signal corresponding to the rotation speed of the helical gear or the rotation speed of the input shaft of the automatic transmission or the like.

Figure 9A:
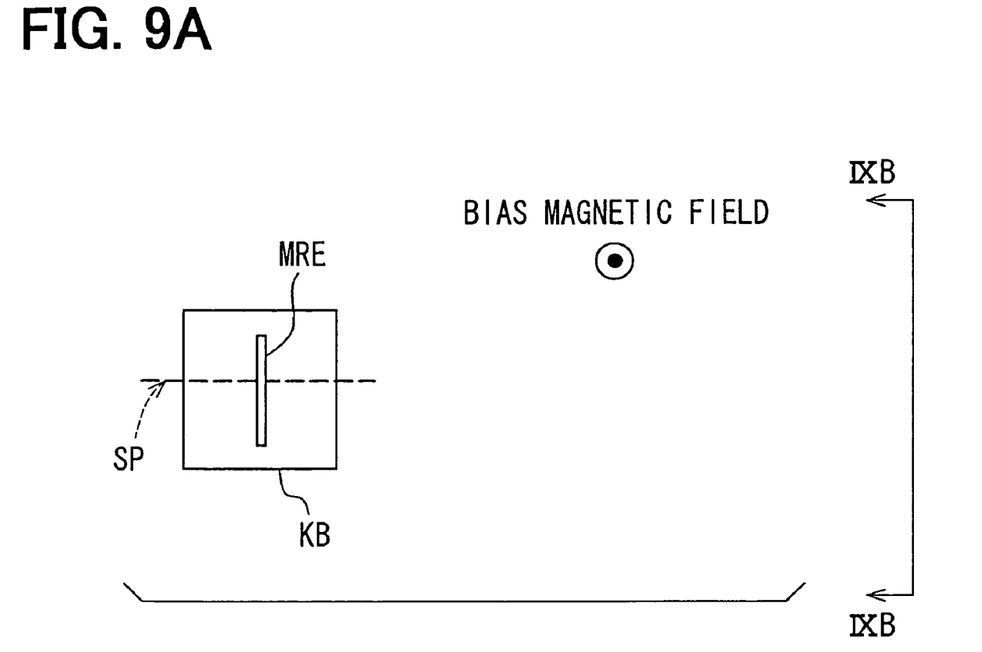
FIG. 9A is a diagrammatic view showing relationships among a sensing plane, a bias magnetic field and magnetic resistance elements in a further embodiment of the invention.

In the case where the rotor RT, or the helical gear, used in the automatic transmission (for example, shown in FIG. 9) rotates, the angular change of the magnetic vector generated by the bias magnet MG occurs along a hypothetical plane perpendicular to the line of inclination of each tooth of the rotor RT. If a sensing plane SP of the magnetic resistance element is parallel to a plane of rotation of the helical gear rotor, there is a possibility that the change of the resistance of the magnetic resistance element accompanying the angular change of the magnetic vector may decrease as explained in more detail below. In such a case, there is a possibility that the sensing accuracy of the rotation characteristics of the helical gear rotor may be reduced.

Figure 3A:
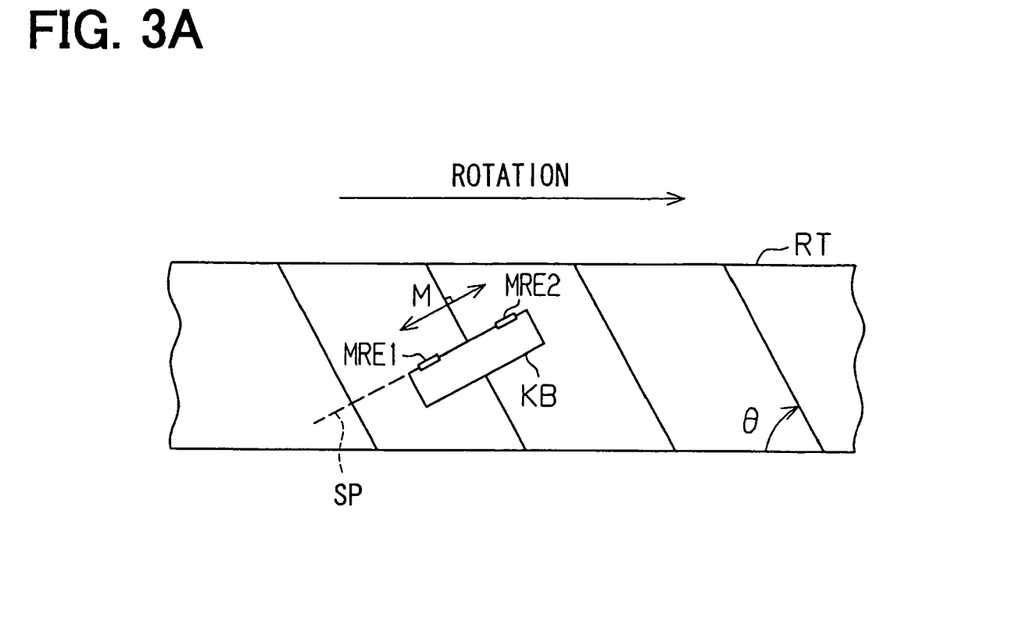
FIG. 3A is a schematic diagram showing a magnetic resistance element according to the embodiment of FIG. 1A.

In contrast, in the present embodiment, as shown in FIG. 3A, the first and second magnetic resistance element pairs MRE1, MRE2 are located in a predetermined position with respect to the rotor RT. The first and second magnetic resistance element pairs MRE1, MRE2 are located on a platform KB inside the IC chip 11. Each tooth of the rotor RT is inclined with respect to the rotational direction of the rotor RT by a certain angle θ, which is not a right angle.

Figure 3B:
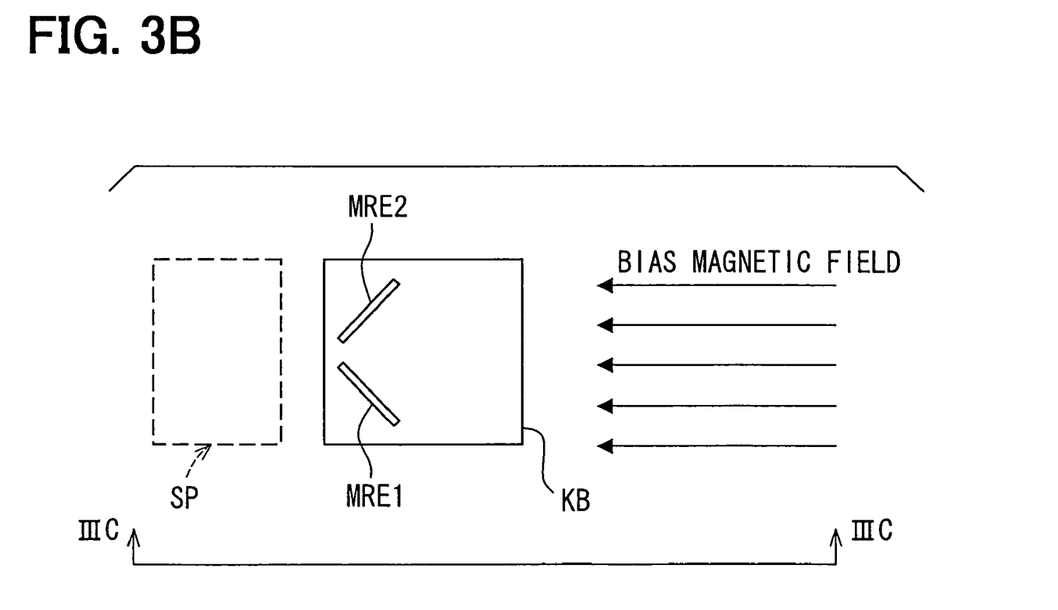
FIG. 3B is a diagrammatic view showing relationships among a sensing plane, a bias magnetic field and magnetic resistance elements.
Figure 3C:
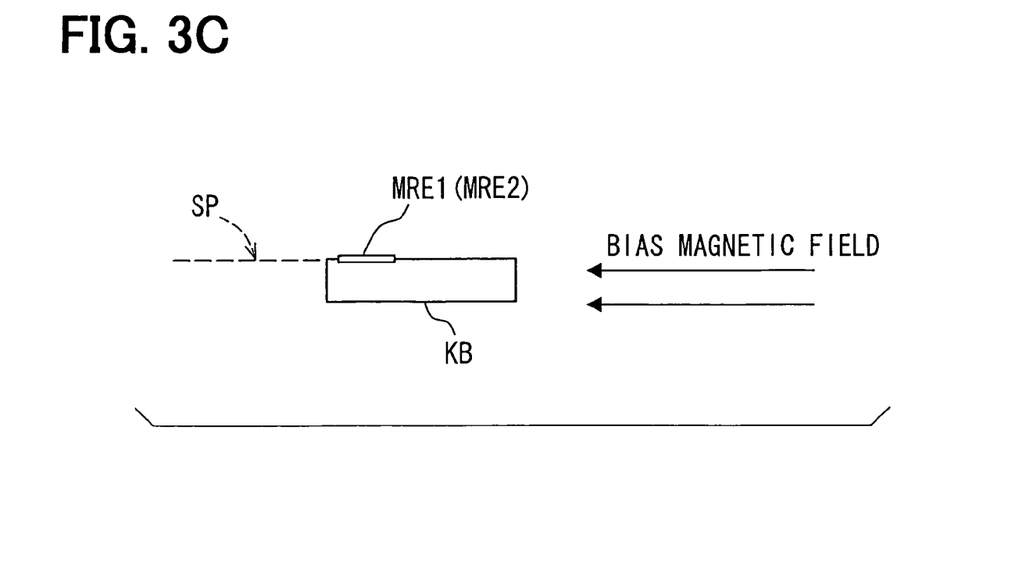
FIG. 3C is a diagrammatic view showing relationships among a sensing plane, a bias magnetic field and magnetic resistance elements as seen from the plane represented by line IIIC—IIIC in FIG. 3B.

FIGS. 3B and 3C show in detail the relationships among the first and second magnetic resistance element pairs MRE1, MRE2, the bias magnetic field of the magnet MG, and a hypothetical sensing plane SP in the embodiment of FIG. 3A. In the embodiment of FIG. 3A, a plane of the magnetic resistance element pairs MRE1, MRE2 is parallel to the sensing plane SP. Also, in the embodiment of FIG. 3A, the sensing plane SP is parallel to the lines representing the bias magnetic field, and longitudinal axes of the first and second magnetic resistance element pairs MRE1, MRE2 are oriented at an angle of approximately forty-five degrees with respect to the lines representing the bias magnetic field. The magnetic resistance element is bent at no less than two points in the plane of the magnetic resistance element pairs MRE1, MRE2. Although the rotor RT is not shown in FIGS. 3B and 3C, the sensing plane SP is perpendicular to lines that represent the tips of the rotor teeth, as shown in FIG. 3A.

Figure 4A:
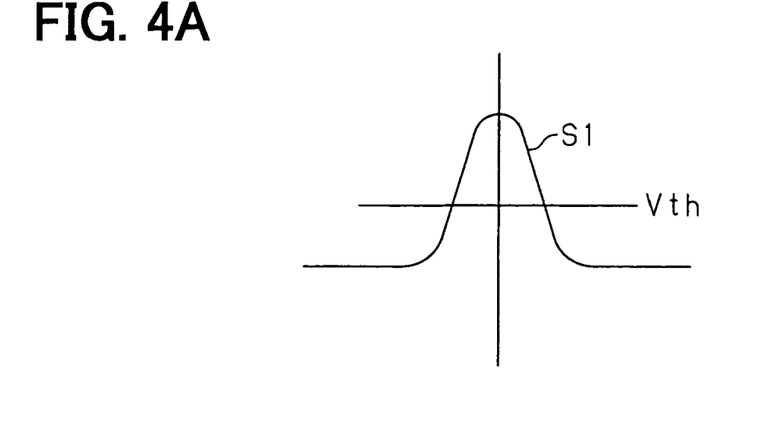
FIG. 4A is a graph showing a waveform of a signal that has undergone differential amplification according to the embodiment.

By arranging the first and second magnetic resistance element pairs MRE1, MRE2 in such a way, the angular change M of the magnetic vector accompanying the rotation of the helical gear rotor RT is output as the change of the resistances of the magnetic resistance elements MRE1a, MRE1b, MRE2a, MRE2b. Therefore, as shown in FIG. 4A, the amplitude of the signal S1 (differential amplification output S1), which has been subjected to differential amplification by the differential amplifier 14, has a margin with respect to the threshold voltage Vth set in the comparator 15. As a result, the comparator 15 can produce a stable binary output.

Figure 3D:
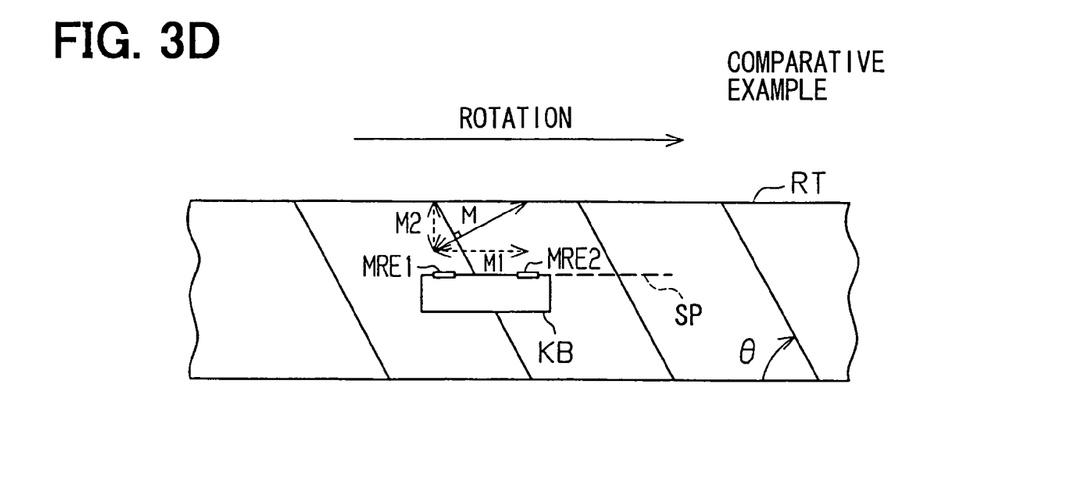
FIG. 3D is a schematic diagram of a magnetic resistance element of a comparative example.

In FIG. 3D, a first and second magnetic resistance element pairs MRE1, MRE2 of a comparative example are shown. The first and second magnetic resistance element pairs MRE1, MRE2 shown in FIG. 3D are located such that a hypothetical sensing plane SP is parallel to the plane of rotation of the helical gear rotor RT.

Figure 4B:
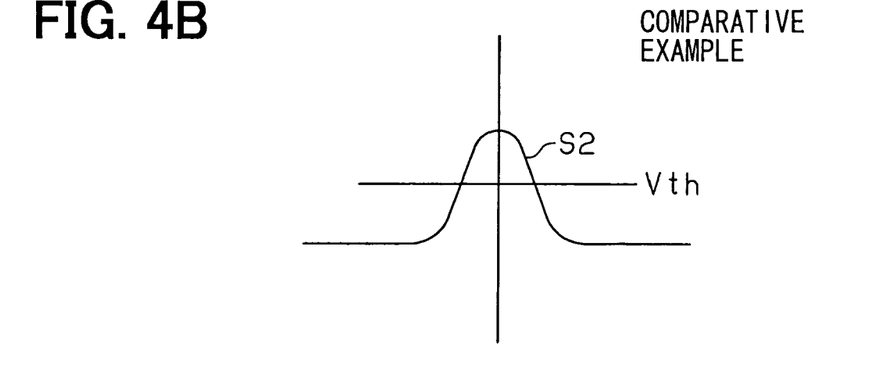
FIG. 4B is a graph showing a waveform of a signal of the comparative example of FIG. 3D that has undergone differential amplification.

In the structure of FIG. 3D, only a part of the angular change M of the magnetic vector accompanying the rotation of the rotor RT is reflected in the change of the resistances of the first and second magnetic resistance element pairs MRE1, MRE2. That is, if the angular change M of the magnetic vector is separated into a change amount M1, which is a component along the rotating direction of the rotor RT, and a change amount M2, which is a component perpendicular to the rotating direction, only the change amount M1 appears as the change of the resistances of the first and second magnetic resistance element pairs MRE1, MRE2. Therefore, as shown in FIG. 4B, the amplitude of the signal S2 (differential amplification output S2), which has been subjected to differential amplification by the differential amplifier 14, is smaller than the differential amplification output S1. In such a case, there is a possibility that an erroneous pulse may be generated depending on the threshold voltage Vth set in the comparator 15.

In the embodiment of FIG. 3A, a sensing plane SP of the first and second magnetic resistance element pairs MRE1, MRE2 is perpendicular to the line of inclination of each tooth of the helical gear rotor RT. Therefore, the angular change of the magnetic vector accompanying the rotation of the rotor RT can be sensed as the change of the resistances of the magnetic resistance elements with high sensitivity. Accordingly, the rotation characteristics of the input shaft or the output shaft of the automatic transmission can be sensed accurately. Moreover, rotation can be sensed without a dedicated member to be sensed such as a magnetic spur gear rotor or a magnetized rotor. Therefore, costs and space are saved.

The first and second magnetic resistance element pairs MRE1, MRE2 that respectively provide electric half bridges are used as the magnetic resistance elements. The differential amplification output of the middle point voltages of the first and second magnetic resistance element pairs MRE1, MRE2 is compared with the threshold voltage Vth to obtain the binary output corresponding to the rotation characteristics of the rotor RT. As a result, sensing accuracy of the rotation characteristics of the helical gear rotor is improved.

A helical gear used as a working gear (used to transmit power) in the automatic transmission of the vehicle is used as the rotor RT. Therefore, the rotation characteristics of the input shaft or the output shaft can be suitably sensed without consuming space inside the automatic transmission by adding a rotor dedicated to rotation sensing, inside the automatic transmission.

The rotor RT is not limited to one having a helical gear used in the automatic transmission. Any helical gear can be used as a rotor RT, i.e., as a rotating body to be sensed, if the helical gear has peaks and valleys that are arranged alternately on the periphery of the gear at a certain inclination angle (other than a right angle) with respect to the rotating direction of the gear.

Figure 5:
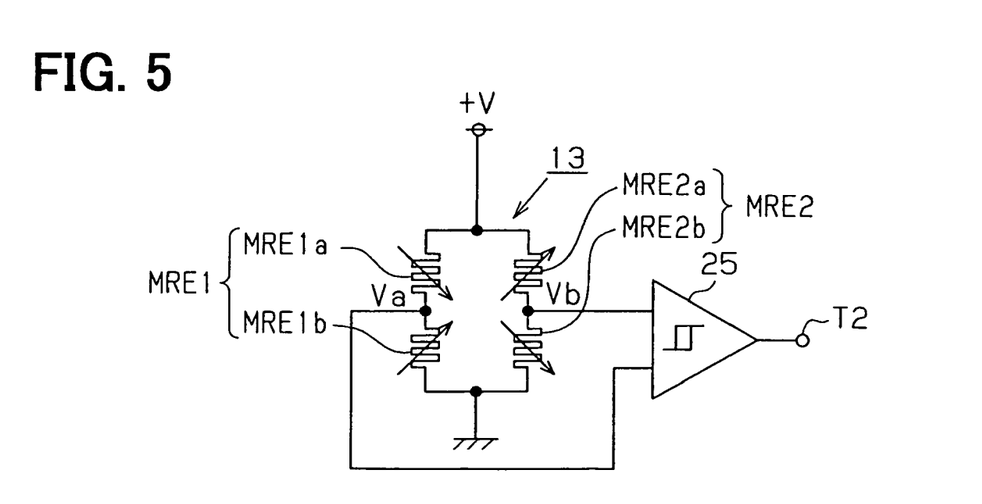
FIG. 5 is a circuit diagram of a processing circuit of a further embodiment.
Figure 6:
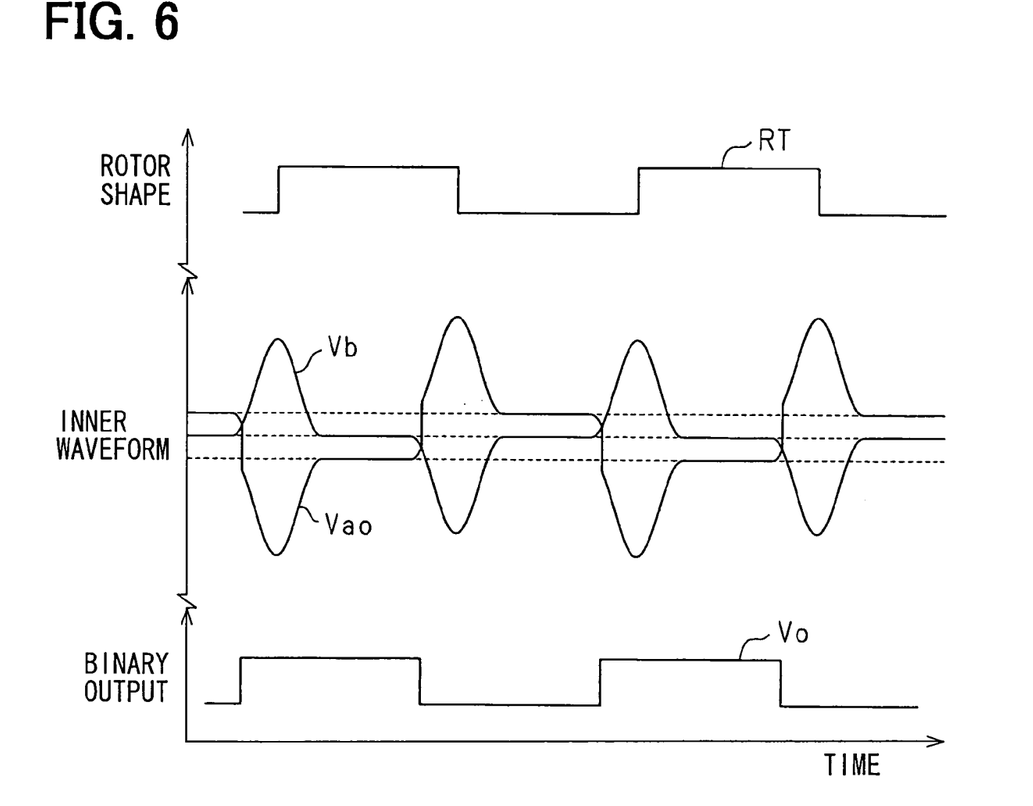
FIG. 6 is a graph showing a waveform inside the processing circuit and a waveform output from the processing circuit of the embodiment of FIG. 5.

A processing circuit 13 shown in FIG. 5 of the sensor having the first and second magnetic resistance element pairs MRE1, MRE2 may be employed. The processing circuit 13 shown in FIG. 5 is provided by a hysteresis comparator 25. The hysteresis comparator 25 offsets at least one of the middle point voltages derived from the first and second magnetic resistance element pairs MRE1, MRE2 so that the middle point voltages intersect each other with a hysteresis. The hysteresis comparator 25 compares the offset middle point voltage with the other middle point voltage to obtain a binary output corresponding to the rotation characteristics of the helical gear rotor RT. In this case, the middle point voltages Vao, Vb having the offset are represented by the inner waveform shown in FIG. 6. In this example shown in FIG. 6, only the middle point voltage Vao derived from the first magnetic resistance element pair MRE1 is offset. Therefore, even in the case where the middle point voltages Vao, Vb include noise, frequent intersection between the two middle point voltages Vao, Vb is restricted. As a result, more accurate binary output Vo corresponding to the rotation characteristics of the helical gear rotor RT can be obtained.

In the embodiment of FIG. 3A, the first and second magnetic resistance element pairs MRE1, MRE2 that respectively form the electrical half bridges serve as the sensor. However, the electrical structure of the sensor is not so limited. For example, one magnetic resistance element pair MRE1 that forms an electric half bridge circuit may be provided as the sensor as shown in FIGS. 7A, 7B, 7C and 8. In this case, the rotation characteristics of the helical gear rotor RT can be sensed while maintaining certain accuracy. In this case, the electric structure shown in FIG. 8 can be employed as the electric structure of the sensor and the processing circuit.

Alternatively, one magnetic resistance element may be used as a magnetic resistance element and a change of a resistance of the magnetic resistance element may be derived as a change of voltage, in order to sense the rotation characteristics of the helical gear rotor RT based on the derived voltage change.

Figure 7A:
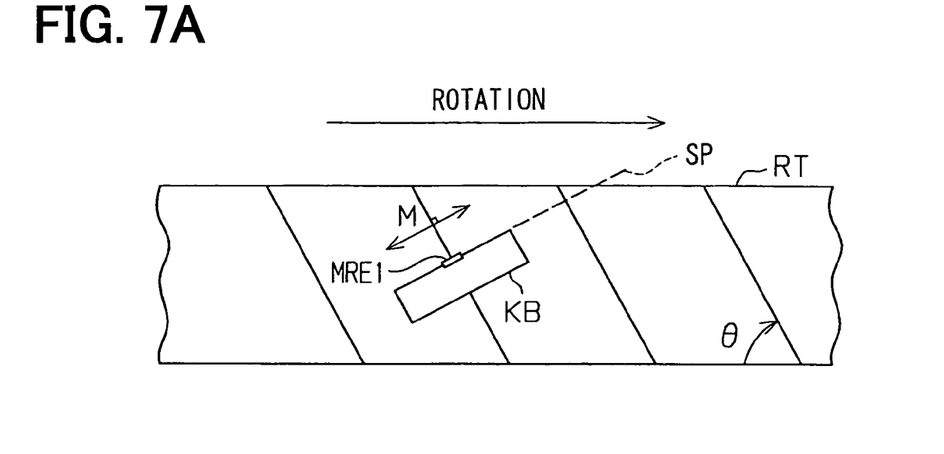
FIG. 7A is a schematic diagram showing a rotation sensor of a further embodiment.
Figure 7B:
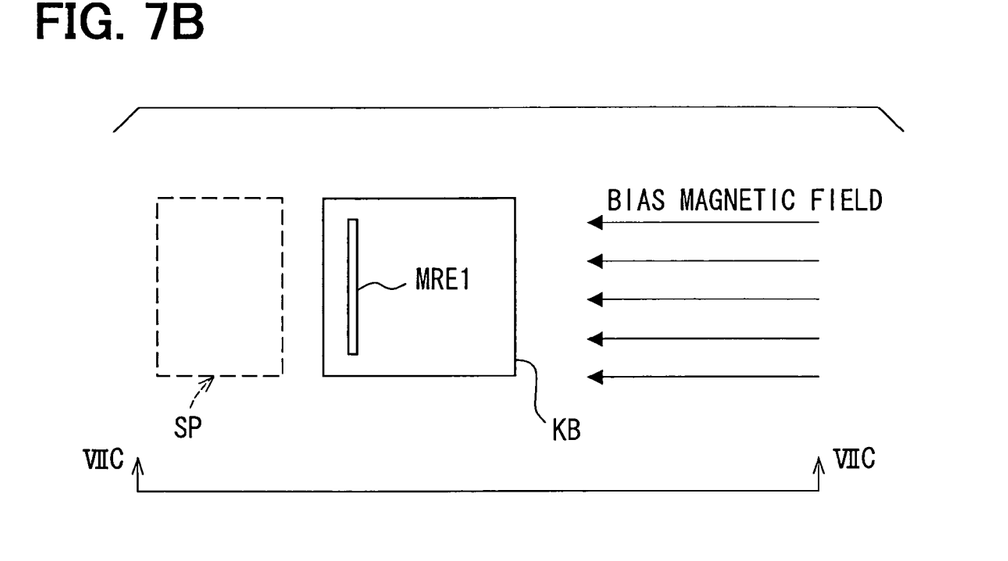
FIG. 7B is a diagrammatic view showing relationships among a sensing plane, a bias magnetic field and magnetic resistance elements.
Figure 7C:
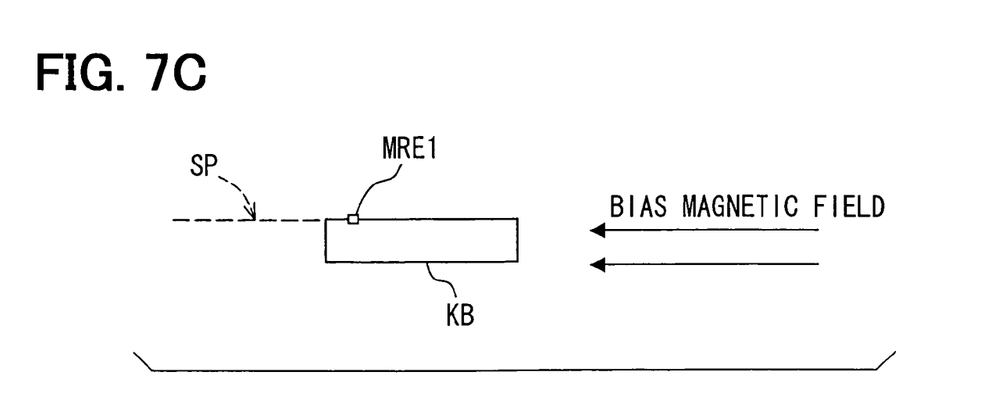
FIG. 7C is a diagrammatic view showing relationships among a sensing plane, a bias magnetic field and magnetic resistance elements as seen from the plane represented by line VIIC—VIIC in FIG. 7B.
Figure 8:
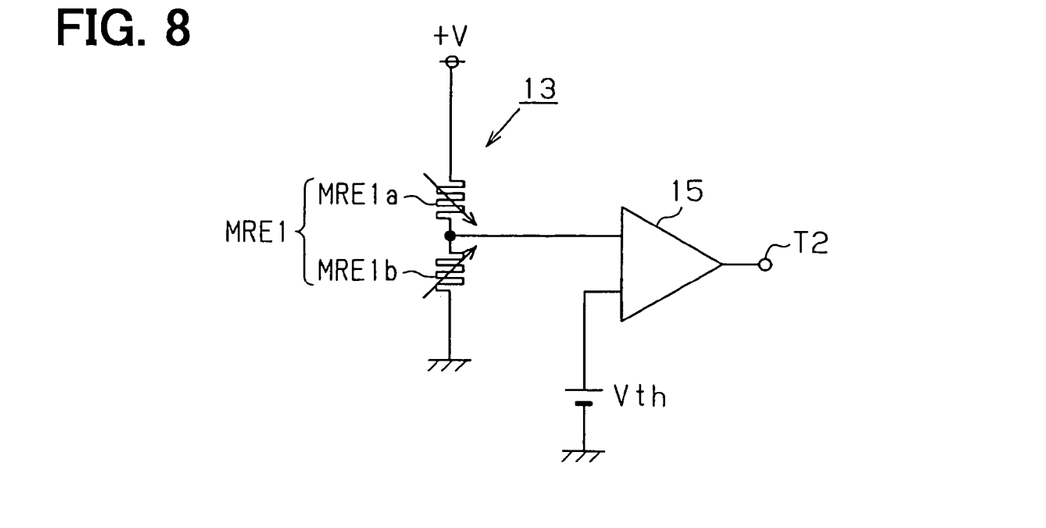
FIG. 8 is a circuit diagram showing an equivalent circuit inside a chip of the embodiment of FIG. 7A.

FIGS. 7B and 7C show in more detail the relationships among the magnetic resistance element pair MRE1, the sensing plane SP, and the lines that represent the bias magnetic field in the embodiment of FIG. 7A. In the embodiment of FIG. 7A, the longitudinal axis of the magnetic resistance pair MRE1 is parallel to the sensing plane SP. The magnetic resistance element is bent at no less than two points in a plane of the magnetic resistance pair MRE1. The sensing plane SP is parallel to the plane of the magnetic resistance pair MRE1, as shown. Although the rotor RT is not shown in FIGS. 7B and 7C, the sensing plane SP is preferably perpendicular to lines that represent the tips of the teeth of the rotor RT, as shown in FIG. 7A.

The magnetic resistance element and the processing circuit 13 may be separate. For example, the rotation sensor 10 may have only a sensor that includes the magnetic resistance element pair MRE1, and a signal output by the rotation sensor 10 may be processed by a separate processing portion, outside the rotation sensor 10.

The angular change of the magnetic vector of the bias magnet MG accompanying the rotation of the helical gear rotor is normally caused along a hypothetical plane perpendicular to the line of inclination, or a line defined by the tip, of each tooth of the rotor. However, there is a possibility that the angular change of the magnetic vector is generated while the angular change is deviated from the hypothetical perpendicular plane if the angular change is affected by magnetic bodies located nearby. Therefore, in order to further improve the accuracy of the rotation sensor 10 for sensing the rotation, a hypothetical plane on which the angular change of the magnetic vector provided by the bias magnet MG is caused should be preferably identified through experimentation or the like, and a sensing plane SP of the magnetic resistance element(s) should be preferably located on the identified hypothetical plane, in practice.

Figure 9B:
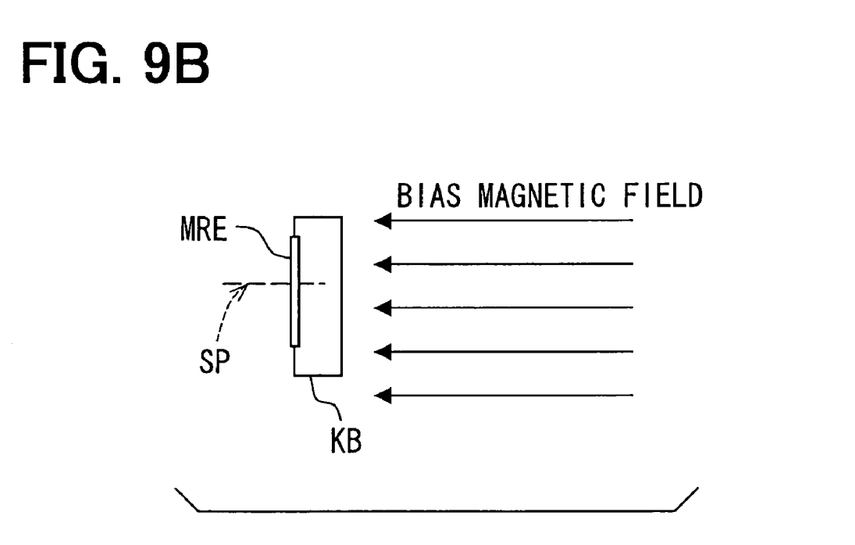
FIG. 9B is a diagrammatic view showing relationships among a sensing plane, a bias magnetic field and magnetic resistance elements as seen from the plane represented by line IXB—IXB in FIG. 9A.

FIGS. 9A and 9B show a further embodiment in which a single magnetic resistance pair MRE is employed. The magnetic resistance element is bent at no less than two points in a plane of the magnetic resistance pair MRE. In the embodiment of FIGS. 9A and 9B, the sensing plane SP is perpendicular to the plane of the magnetic resistance pair, as shown. In this embodiment, the longitudinal axis of the magnetic resistance pair MRE is perpendicular to the sensing plane SP. Also, although the rotor RT is not shown in FIGS. 9A and 9B, the sensing plane SP is preferably perpendicular to the lines defined by the tips of the gear teeth on the rotor RT.

The structures or arrangements of the magnetic resistance element(s) shown in FIGS. 2, 3A–3D, 5, 7A–7C, 8, 9A and 9B are representative examples. Other structures or arrangements of the magnetic resistance element(s) may be employed and the sensing plane of the magnetic resistance element(s) is preferably perpendicular to the lines that represent the tips of the teeth of the rotor.

The present invention should not be limited to the disclosed embodiments, but may be implemented in many other ways without departing from the spirit of the invention.

What is claimed is:

1. A rotation sensor comprising:
a sensor having a magnetic resistance element; and
a bias magnet for applying a bias magnetic field to the magnetic resistance element, wherein
the sensor senses rotation characteristics of a helical gear rotor made of a magnetic material by sensing an angular change of a magnetic vector caused by rotation of the rotor near the sensor and by the bias magnetic field, and
the magnetic resistance element is located such that a sensing plane of the magnetic resistance element is parallel to a hypothetical plane, on which the angular change of the magnetic vector is generated by the rotation of the rotor and the bias magnetic field.

2. The rotation sensor as in claim 1, wherein the magnetic resistance element is located on a hypothetical plane perpendicular to a line defined by a tip of each tooth of the helical gear.

3. The rotation sensor as in claim 1, wherein the magnetic resistance element includes a pair of magnetic resistance elements, and the pair of the magnetic resistance elements are arranged to form an electric half bridge circuit.

4. The rotation sensor as in claim 3, further comprising a processing circuit for providing a binary output corresponding to the rotation characteristics of the rotor by comparing a middle point voltage, which is derived from the magnetic resistance elements, with a predetermined threshold voltage.

5. The rotation sensor as in claim 1, wherein the magnetic resistance element includes two pairs of magnetic resistance elements, and the pairs are arranged to form electric half bridge circuits.

6. The rotation sensor as in claim 5, further comprising a processing circuit that has a differential amplifier for performing differential amplification of middle point voltages derived from the pairs of magnetic resistance elements and that has a comparator for comparing a differential amplification output of the middle point voltages with a threshold voltage to obtain a binary output corresponding to the rotation characteristics of the rotor.

7. The rotation sensor as in claim 5, further comprising a hysteresis comparator that offsets at least one of middle point voltages derived from the pair of magnetic resistance elements so that the middle point voltages intersect with each other with a hysteresis and that compares the middle point voltages to obtain a binary output corresponding to the rotation characteristics of the rotor.

8. The rotation sensor as in claim 1, wherein the helical gear rotor is used in an automatic transmission of a vehicle.

9. A rotation sensor comprising:
a sensor having a magnetic resistance element; and
a bias magnet for applying a bias magnetic field to the magnetic resistance element, wherein the sensor senses rotation characteristics of a helical gear rotor made of a magnetic material by sensing an angular change of a magnetic vector caused by rotation of the rotor near the sensor and by the bias magnetic field, and the magnetic resistance element is located such that the angular change of the magnetic vector generated by the rotation of the rotor and the bias magnetic field is maximized.

10. The rotation sensor as in claim 9, wherein the magnetic resistance element includes a pair of magnetic resistance elements, and the pair of the magnetic resistance elements are arranged to form an electric half bridge circuit.

11. The rotation sensor as in claim 10, further comprising a processing circuit for providing a binary output corresponding to the rotation characteristics of the rotor by comparing a middle point voltage, which is derived from the magnetic resistance elements, with a predetermined threshold voltage.

12. The rotation sensor as in claim 9, wherein the magnetic resistance element includes two pairs of magnetic resistance elements, and the pairs are arranged to form electric half bridge circuits.

13. The rotation sensor as in claim 12, further comprising a processing circuit that has a differential amplifier for performing differential amplification of middle point voltages derived from the pairs of magnetic resistance elements and that has a comparator for comparing a differential amplification output of the middle point voltages with a threshold voltage to obtain a binary output corresponding to the rotation characteristics of the rotor.

14. The rotation sensor as in claim 12, further comprising a hysteresis comparator that offsets at least one of middle point voltages derived from the pair of magnetic resistance elements so that the middle point voltages intersect with each other with a hysteresis and that compares the middle point voltages to obtain a binary output corresponding to the rotation characteristics of the rotor.

15. The rotation sensor as in claim 9, wherein the rotor is a helical gear used in an automatic transmission of a vehicle.

* * * * *